United States Patent Office 2,895,877
Patented July 21, 1959

2,895,877
COMPOSITION AND METHOD FOR RELIEVING SPASTICITY

David F. Marsh, Lafayette Hill, Pa., assignor to McNeil Laboratories, Incorporated, Philadelphia, Pa., a corporation of Pennsylvania No Drawing. Application July 30, 1956
Serial No. 600,703

11 Claims. (Cl. 167—65)

The present invention relates to novel medical preparations for the relief of spasticity and to a method for relieving spasticity. The present application is a continuation-in-part of application Serial No. 527,145, filed August 8, 1955, and now abandoned.

Spasticity is an uncontrolled, involuntary, excessive contraction of one or more skeletal muscles and is a major component of many common disease conditions. It has been difficult if not impossible to relieve clinically. The manifestations of spasticity range in severity from those observed in minor transient injuries to localized areas, such as sprains and strains, through more serious conditions, such as chronic low back pain (lumbago), rheumatoid arthritis and rheumatoid spondylitis to the very severe incapacitating neurological diseases, such as multiple sclerosis, Parkinson's disease, cerebral palsy, and the like.

Mephenesin is known to relieve, in animals, experimentally induced spasticity, that is, to produce relaxation of the skeletal muscles, by a mechanism involving the depression of the polysynaptic pathways of the central nervous system. The activity of this compound is so low and the duration so brief, that it is not feasible to employ this material clinically for the relief of spasticity. In addition, as is known, the administration of this material produces undesirable side effects, such as initial excitement, salivation, nausea and vomiting. There are also certain other compounds, discussed in the literature, which are stated to possess this ability to relax skeletal muscles. These compounds include 2-aminobenzoxazole, 2-amino-5-chlorobenzothiazole and 2-amino-6-methylbenzothiazole. However, these compounds also produce the undesirable effects mentioned above even at the dose levels insufficient to produce muscular relaxation (L. S. Goodman and A. Gilman, pp. 206–208, The Pharmacological Basis of Therapeutics, second ed., 1955, The MacMillan Co., New York).

It is the principal object of the present invention to provide novel compositions possessing valuable therapeutic properties, that is, the ability to produce relaxation of the skeletal muscles by a mechanism involving the depression of the polysynaptic pathways of the central nervous system and thus the ability to relieve spasticity in animals and man.

It is another object of the invention to provide novel medical preparations which possess the beneficial action on the central nervous system referred to above, without, however, deleterious side effects, such as initial excitement, salivation, nausea or vomiting.

Still another object of the present invention is to provide novel medical preparations capable of producing, at reasonable doses, useful relaxation of skeletal muscles for substantial periods of time and which possess a wide margin between the effective dose and the lethal dose.

A further object is to provide a novel method for relieving spasticity in animals and man.

Other objects, including the provision of means for preparing the novel compositions, will become apparent from a consideration of the following specification and claims.

The composition of the present invention comprises a benzoxazole compound selected from the group consisting of 2-hydroxy benzoxazoles having the structural formula:

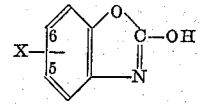

where X is selected from the group consisting of 5-chloro, 5-bromo, 6-chloro and 6-bromo, and salts thereof, and a pharmaceutical carrier.

The compositions of the present invention have been found to produce relaxation of the skeletal muscles by a mechanism involving the depression of the polysynaptic pathways of the central nervous system. That is to say, the compositions prevent or overcome hypertonia and hyperflexia by selective depression of subcortical and spinal polysynaptic pathways. Compared to mephenesin, the present compositions are at least four times as active in producing relaxation when given orally, have an exceptionally long duration of action (up to 24 hours in therapeutic doses), have a wide safety margin between effective dose and lethal dose, and lack any significant side effects, including initial excitement, nausea or vomiting. The compositions may therefore be readily employed for the relief of spasticity in animals and man. Of special importance is the fact that the compositions are highly effective orally, and the preferred compositions are, therefore, adapted for oral administration such as in the form of suspension, capsule or tablet dosage form. As will appear hereinafter, numerous tests have been made using compositions of the invention in various species of animals and in man from which it is evident that the compositions are highly effective in the relaxation of the skeletal muscles and are safe.

The 2-hydroxy-5- or 6-chloro- or bromo-benzoxazole may be prepared by hydrolysis of the corresponding 2-amino-5- or 6-chloro- or bromo-benzoxazole. Specific examples of the preparation of 2-hydroxy-5-chlorobenzoxazole and 2-hydroxy-6-bromobenzoxazole in accordance with this procedure are as follows:

EXAMPLE A

A solution of 16.9 g. (0.1 mole) of 2-amino-5-chlorobenzoxazole in 200 ml. of 1 N HCl is refluxed until precipitation is complete. The resulting solid is collected by filtration, dissolved in 200 ml. of 1 N NaOH and the solution extracted with 50 ml. of ether. Acidification of the alkaline solution gives a precipitate which is purified by crystallization from acetone to give 2-hydroxy-5-chlorobenzoxazole melting at 191–191.5° C.

The calculated N content for $C_7H_4ClNO_2$ is 8.26; that found is 8.1.

EXAMPLE B

A suspension of 5 g. of 2-amino-6-bromo-benzoxazole in 60 ml. of 1 N hydrochloric acid is refluxed for 10 hours. The product is dissolved in dilute sodium hydroxide and reprecipitated with glacial acetic acid. Crystallization from aqueous acetone gives 2-hydroxy-6-bromobenzoxazole (6-bromobenzoxazolinone), M.P. 188–190°.

The 2-hydroxy-5- or 6-chloro- or bromo-benzoxazole may also be prepared by heating the corresponding 2-hydroxy-5- or 6-chloro- or bromo-phenylurea or 2-hydroxy-5- or 6-chloro- or bromo-phenylthiourea in acid solution. A specific example of this procedure is as follows:

EXAMPLE C 9.8 g. (0.05 mole) of N-(5-chloro-2-hydroxyphenyl) urea, 4.1 ml. (0.05 mole) of concentrated HCl and 50 ml. of water are refluxed for 3 hours. After 30 minutes needles begin to separate. At the end of refluxing the hot mixture is filtered. The solid is dissolved in sodium hydroxide solution and the solution is extracted with ether. Acidification of the alkaline layer gives 2-hydroxy-5-chlorobenzoxazole.

The 2-hydroxy-5- or 6-chloro- or bromo-benzoxazoles may also be prepared by reacting the appropriate 2-aminochloro- or bromo-phenol with a carbonyl halide, such as phosgene. An example of this procedure is as follows:

EXAMPLE D

A suspension of 14.6 g. (0.078 mole) of 2-amino-4-bromophenol and 15.6 g. of sodium acetate in 100 ml. of ethyl acetate is treated with stirring with a solution of 9.4 g. (0.096 mole) of phosgene in 200 ml. of ethyl acetate. After the addition is complete the mixture is refluxed for one hour and is then treated with 200 ml. of water. The organic layer is separated, washed with water and the solvent is removed in vacuo. The residue is dissolved in dilute sodium hydroxide and the solution treated with charcoal. The product is precipitated with conc. hydrochloric acid and is recrystallized from aqueous methyl alcohol. There is obtained 2-hydroxy-5-bromobenzoxazole (5 - bromobenboxazolinone), M.P. 214–216°.

An example of the preparation of 2-hydroxy-6-chlorobenzoxazole by chlorination of 2-hydroxybenzoxazole is as follows:

EXAMPLE E

A solution of 10 g. (0.07 mole) of benzoxazolinone in 200 ml. of chloroform is treated with 5.3 g. (0.07 mole) of chlorine. The reaction mixture is stirred and cooled in an ice bath during the addition and stirring is continued for one hour after the addition is complete. The white precipitate is recrystallized from aqueous methyl alcohol. There is obtained 2-hydroxy-6-chlorobenzoxazole (6-chlorobenzoxazolinone), M.P. 196–196°.

The described 2-hydroxybenzoxazoles possess acidic properties enabling them to form salts with bases, and these compounds may be employed as the acid or as a salt. These salts can readily be prepared by reaction between the 2-hydroxybenzoxazole and a base, such as the alkali metal or alkaline earth metal oxides, hydroxides, carbonate, and the like; ammonia or a substituted ammonia, such as piperidine, butylamine, triethylamine, ethanolamine, ethylenediamine, and the like.

If a salt is employed, the salt will be pharmaceutically acceptable and any toxicity or other undesirable effects which may be imparted should be taken into consideration as well known in the art. Pharmaceutically useful salts should not be substantially more toxic than the compound itself and should be able to be incorporated in liquid or solid pharmaceutical media for the preparation of therapeutically useful compositions.

In preparing the compositions of the present invention the benzoxazole compound will be combined with a significant amount of a pharmaceutical carrier. The carrier may take a wide variety of forms depending upon the form of the preparation desired for administration. For parenteral injection the carrier may be sterile water with suitable adjustment of the pH to insure solution of the benzoxazole compound. For example, the compounds not in salt form are practically insoluble in water while the salts vary in solubility, and in some cases the solubility of a salt is not sufficient to provide the desired concentration. In this case the pH may be further adjusted. As stated, the preferred form of administration of the present composition is oral, and the oral dosage may be in the form of a suspension, powder adapted for suspension in liquid media, tablet or capsule. In preparing the compositions in oral dosage form any of the usual pharmaceutical carrier media may be employed, such as gelatin, in the case of capsules; sterile water, glycols, oils, alcohols, and the like in the case of suspensions; starches, sugars, kaolin, salts, lubricants, binders, and the like in the case of powders and tablets. Tablets represent the most advantageous oral dosage form.

The amount of the composition administered and the amount of 2-hydroxybenzoxazole compound in the composition may vary somewhat depending upon the severity of the spasticity and upon the species being treated. As far as administration is concerned, the amount of composition administered may range from that providing as little as about 2 milligrams of the benzoxazole compound per kilogram of body weight to that providing as high as about 100 milligrams per kilogram, preferably in the case of humans, that providing between about 5 and about 40 milligrams of benzoxazole compound per kilogram of body weight. In the composition, the concentration of the benzoxazole compound should be at least about 1%, by weight, preferably at least about 2%. The concentration of the benzoxazole compound may vary widely above these figures depending upon the form the composition takes, and in some cases the concentration of the benzoxazole compound may go as high as about 80–90%. Depending also upon the severity of the spasticity and upon the species being treated, as stated, the amount of benzoxazole compound per dosage unit form may also vary widely. Generally, the compositions per dosage unit will contain at least about 25 milligrams of the benzoxazole compound, and in some cases, such as in compositions for the treatment of large domestic animals, like horses, the amount per dosage unit may reach as high as about 10,000 milligrams. In the case of compositions adapted for human administration, the amount will generally range between about 100 and about 1000 milligrams of benzoxazole compound per dosage unit.

The present invention will be more readily appreciated from a consideration of the following specific examples which are given for the purpose of illustration and are not intended to limit the scope of the invention in any way. In these examples, as is customary in pharmacological investigations, albino mice of a uniform age and weight and from a standard strain are used as a primary test object since they are readily available and since the relative activity of depressant drugs in these animals as compared to useful drug actions in man is well known. Results have also been confirmed by repetition in higher animal species including rats, hamsters, dogs, cats and guinea pigs and some of this is referred to in examples below. Finally, results have been confirmed in man. The primary criterion used for the presence of skeletal muscular relaxation in animals, especially the smaller animals, is the inability of the animal to roll over when placed flat upon its back. This is a convenient end point for the experimental observer, but is far in excess of the amount of skeletal muscular relaxation desired in man. Much of the following data are based on this observation although numerous concurrent confirmatory observations of skeletal muscular relaxation were made. Because of the foregoing and because of expected differences in the relative responsiveness of man and animal to drugs of this type, much of the following data are based on doses that produce effects that could be considered excessive for ordinary clinical use.

EXAMPLES I–II

In these examples is used a 2% suspension of 2-hydroxy-5-chlorobenzoxazole in an aqueous solution consisting of 8.6% polyethylene glycol 300, 0.5% sodium carboxymethylcellulose and the remainder water.

Two albino mice, designated I and II, respectively, receive oral administrations of this suspension in an amount of 333 and 1000 mg. of the benzoxazole per kilogram of body weight, respectively.

Mouse I shows skeletal muscular relaxation for 1–2 hours, but does not lose the righting reflex.

Mouse II loses the righting reflex in 2 minutes and respiratory failure occurs in 38 minutes.

EXAMPLES III–VII

In these examples, five groups (designated groups III through VII of 2–7 albino mice receiver intraperitoneal injections of a 1% solution of 2-hydroxy-5-chlorobenzoxazole in water containing sufficient sodium hydroxide to provide a pH of 11. In all cases within a few minutes loss of righting reflex occurs and the duration of this effect is noted and set forth in Table A. The doses, in terms of mg. of the benzoxazole per kilogram of body weight, are also set forth in Table A.

*Table A*

| Group | No. animals in group | Dose, mg./kg. | Duration of effect (min.) |
|---|---|---|---|
| III | 2 | 75 | 4.5 |
| IV | 4 | 100 | 19 |
| V | 2 | 150 | 36.5 |
| VI | 7 | 200 | 94 |
| VII | 5 | 225 | [1] 89 |

[1] This figure is for the three mice that survive. In the other two respiratory failure occurs in 10 minutes.

EXAMPLES VIII–X

In these examples, three groups (designated groups VIII through X) of two albino rats are given oral administrations of a 2% solution of 2-hydroxy-5-chlorobenzoxazole in water containing sufficient sodium hydroxide to provide a pH of 11.

Group VIII receives 400 mg. of the benzoxazole per kilogram of body weight. One rat loses the righting reflex in 20 minutes for a period of 44 minutes. The other doesn't fully lose the righting reflex.

Group IX receives 600 mg./kg. In 4 minutes, the righting reflex is lost for 110 minutes.

Group X receives 800 mg./kg. In 3 minutes loss of the righting reflex occurs and this progresses to respiratory failure in 30 minutes.

EXAMPLES XI–XIV

In these examples four groups (designated groups XI through XIV) of two hamsters receive oral administrations of the solution employed in Examples VIII–X.

Group XI receives 300 mg. of the benzoxazole per kilogram of body weight, and loses the righting reflex in two minutes for a period of 4 minutes.

Group XII receives 400 mg./kg. The righting reflex is lost in 3 minutes for a period of 29 minutes.

Group XIII receives 500 mg./kg. The righting reflex in this group is also lost in 3 minutes for a period of 29 minutes.

Group XIV receives 600 mg./kg. One animal loses its righting reflex in 2 minutes for 83 minutes. Respiratory collapse occurs in the other after 4 minutes.

EXAMPLE XV

Oral preparations of 2-hydroxy-5-chlorobenzoxazole are given to 7 dogs in dosages ranging from 200 to 265 mg./kg. of body weight, and the following typical results are obtained:

Capsules containing 2-hydroxy-5-chlorobenzoxazole and imbedded in raw liver are given to a dog (male) weighing 9.7 kg. in an amount to provide 220 mg. of drug per kilogram of body weight. Within 70 minutes the dog shows slight ataxia and incoordination. This initial sign of skeletal muscular relaxation increases in intensity until the animal can no longer stand at 110 minutes. The intensity of this effect is strictly equivalent to the loss of righting reflex described above for the smaller animals. However, it continues to increase until the animal is no longer able to swallow or to move its tongue although respiration appears normal or only slightly depressed at 110 minutes. After this maximal effect is reached it is maintained for an indefinite period, but slowly diminishes in intensity until the animal is able to walk 108 minutes later. Seventy-one minutes after this time the animal appears and acts approximately normal.

EXAMPLES XVI–XXXV

The following table illustrates, without undue repetition of the foregoing examples, the comparable skeletal muscle relaxant properties of 2-hydroxy-6-chlorobenzoxazole, 2-hydroxy-5-bromobenzoxazole and 2-hydroxy-6-bromobenzoxazole:

*Table B*

| X | Albino mice, PO, $LD_{50}/PD_{50}$ and LRR | Albino mice, IP, $LD_{50}/PD_{50}$ and LRR | Hamsters, PO, $LD_{50}/PD_{50}$ and LRR | Rats, PO, LRR | Rabbits, IV, LRR |
|---|---|---|---|---|---|
| 5-Cl | 640/300, LRR: 38' at 333 mg./kg. (XVI). | 200/95, LRR: 41' at 150 mg./kg. (XVII). | 800/510, LRR: 44' at 600 mg./kg. (XVIII). | LRR: 240+' at 400 mg./kg. (XIX). | LRR: 7' at 30 mg./kg. (XX). |
| 6-Cl | 2,180/940, LRR: 240' at 940 mg./kg. (XXI). | 350/180, LRR: 47' at 280 mg./kg. (XXII). | 900/500, LRR: 107' at 600 mg./kg. (XXIII). | LRR: 33' at 1,000 mg./kg. (XXIV). | LRR: 4' at 50 mg./kg. (XXV). |
| 5-Br | 1,440/940, LRR: 120' at 940 mg./kg. (XXVI). | 280/120, LRR: 28' at 180 mg./kg. (XXVII). | 900/300, LRR: 70' at 300 mg./kg. (XXVIII). | LRR: 54' at 1,000 mg./kg. (XXIX). | LRR: 4' at 50 mg. kg. (XXX). |
| 6-Br | 2,000/1,000, LRR: 62' at 1,000 mg./kg. (XXXI). | 350/280, LRR: 8' at 280 mg./kg. (XXXII). | 1,000/700, LRR: 210' at 800 mg./kg. (XXXIII). | LRR: 1,440+' at 1,000 mg./kg. (XXXIV). | LRR: 4' at 50 mg./kg. (XXXV). |

In the above table "PO" means per os, or oral administration; "IP" means intraperitoneal administration; "IV" means intravenous administration; "$LD_{50}$" means the dose of compound, in milligrams per kilogram of body weight, to be lethal to half of a group of ten species tested; "$PD_{50}$" means the dose of compound, in milligrams per kilogram of body weight, to produce loss of righting reflex, or flaccid paralysis, in half of a group of ten species tested, and "LRR" means the average duration of loss of righting reflex for those losing their righting reflex at the dose indicated and is given in minutes at an indicated dose in milligrams of compound per kilogram of body weight.

In the examples set forth in the first and third columns of Table B, the compounds were in the form of a 2%, by weight, suspension in an aqueous solution consisting of 8.6% polyethylene glycol 300, 0.5% sodium carboxymethylcellulose and the remainder water. In the examples set forth in the second, fourth and fifth columns, the compounds were in the form of a 2%, by weight, solution in water to which is added the minimal necessary amount of 10% sodium hydroxide solution to disslove the compound.

The following examples illustrate the preparation of typical compositions of the present invention in oral dosage unit form.

EXAMPLE XXXVI

The following formula is for preparing 8000 tablets (10 grains) each containing 250 mg. of the 2-hydroxybenzoxazole compound:

| | |
|---|---|
| 2-hydroxybenzoxazole compound _____g__ | 2000 |
| Milk sugar _____ | 800 |
| Dibasic calcium phosphate, U.S.P. _____ | 1527.2 |
| Starch (filler and disintegrating agent)_____ | 799.3 |
| Calcium stearate _____ | 56.7 |
| Gelatin solution _____pounds per gallon__ | 1.5 |

In place of the milk sugar, dibasic calcium phosphate and the portion of the starch making up the filler, there may be used sucrose, polyethylene glycol 4000, mannitol and/or calcium carbonate in various combinations and proportions. Starch paste, acacia solution, glucose solution, carboxymethylcellulose solution, shellac, or the like may be used in place of gelatin solution as granulating agent. Calcium stearate is employed as lubricating agent and may be replaced by magnesium stearate, stearic acid, talc or the like.

EXAMPLE XXXVII

The following formula may be employed for preparing 10,000 tablets (11.25 grains) each containing 500 mg. of the 2-hydroxybenzoxazole compound:

| | |
|---|---|
| 2-hydroxybenzoxazole compound__ | 11 lbs., 162 grains. |
| Milk sugar_____ | 1 lb., 13 oz., 96 gr. |
| Starch (filler)_____ | 1 lb., 13 oz., 96 gr. |
| Polyethylene glycol 4000_____ | 7 oz., 24 gr. |
| Starch (disintegrating agent)_____ | 13 oz., 340 gr. |
| Calcium stearate_____ | 1 oz., 180 gr. |
| Gelatin solution_____ | 1.5 pounds per gallon. |

EXAMPLE XXXVIII

The following formula may be employed to make 1000 #3 capsules each containing 100 mg. of the 2-hydroxybenzoxazole compound:

| | |
|---|---|
| 2-hydroxybenzoxazole compound _____g__ | 100 |
| Milk sugar _____g__ | 150 |
| Fill weight _____mg__ | 250 |

In place of or in addition to the milk sugar may be used sucros, dicalcium phosphate, calcium carbonate, kaolin, mannitol and/or starch, and the like.

EXAMPLE XXXIX

The following formula may be employed for preparing a suspension containing 250 mg. of the 2-hydroxybenzoxazole compound per 5 cc:

| | |
|---|---|
| 2-hydroxybenzoxazole compound (200 mesh)__g__ | 51.5 |
| Propylene glycol _____g__ | 50 |
| 70% sorbitol solution _____g__ | 250 |
| Alcohol (7.7%) _____cc__ | 77 |
| Carboxymethyl cellulose (low viscosity, type 70) _____g__ | 10 |
| Granulated sugar _____g__ | 375 |
| Methyl ester of parahydroxybenzoic acid_____g__ | 1.5 |
| Propyl ester of parahydroxybenzoic acid_____g__ | 0.3 |
| Polyoxyethylene sorbitan monooleate _____cc__ | 0.5 |
| Flavoring _____cc__ | 3 |
| Citric acid _____g__ | 1.5 |
| Water, q.s.ad. _____cc__ | 1000 |

In place of the propylene glycol may be used polyethylene glycol and/or glycerine. The carboxymethyl cellulose may be replaced by any one of the natural gums used as suspending agents. The parahydroxybenzoic acid esters may be replaced by any commonly used bacteriostatic agent, and other commonly used surface agents may be used in place of the polyoxyethylene sorbitan monooleate.

EXAMPLE XL

The following formula illustrates the preparation of a suspension containing 500 mg. per 5 cc. of the 2-hydroxybenzoxazole compound:

| | |
|---|---|
| 2-hydroxybenzoxazole compound _____g__ | 103 |
| Carboxymethyl cellulose (low viscosity, type 70) _____g__ | 20 |
| 70% sorbitol solution _____g__ | 250 |
| Granulated sugar _____g__ | 375 |
| Propylene glycol _____g__ | 50 |
| Methyl ester of parahydroxybenzoic acid_____g__ | 1.5 |
| Propyl ester of parahydroxybenzoic acid_____g__ | 0.3 |
| Polyoxyethylene sorbitan monooleate _____g__ | 0.5 |
| Methyl salicylate _____cc__ | 2.5 |
| Water, q.s.ad. _____cc__ | 1000 |

Compositions of the invention have been administered, by the present time, to many patients. The periods of administration have been as long as three months, and doses as large as 2 grams of 2-hydroxybenzoxazole compound a day have been used. Most patients received 250 mg. or more three or four times a day. The administration of these compositions has been found to produce a significant degree of relief from muscle stiffness, spasm and pain in patients with the fibrositic type of arthritic involvement and in rheumatoid spondylitis. The compositions also produce prompt symptomatic relief of a moderate to a marked degree from low back pain and muscle spasm, and have been shown to produce a substantial relief of excessive muscle tone in children with spasticity associated with cerebral palsy.

Modification is possible in the selection of carrier material and in the amount thereof in preparing compositions in accordance with the present invention without departing from the scope thereof.

I claim:

1. A pharmaceutical composition comprising at least about 1%, by weight, of a 2-hydroxybenzoxazole compound selected from the group consisting of 2-hydroxybenzoxazoles having the structural formula:

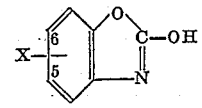

where X is selected from the group consisting of 5-chloro, 5-bromo, 6-chloro and 6-bromo, and salts thereof, and a pharmaceutical carrier therefor suitable for internal administration.

2. The product of claim 1 wherein the 2-hydroxybenzoxazole compound makes up at least about 2%, by weight, of the composition.

3. The product of claim 1 wherein X is 5-chloro.

4. A pharmaceutical composition comprising at least about 1%, by weight, of a 2-hydroxybenzoxazole compound selected from the group consisting of 2-hydroxybenzoxazoles having the structural formula:

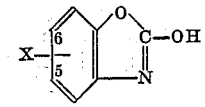

where X is selected from the group consisting of 5-chloro, 5-bromo, 6-chloro and 6-bromo, and salts thereof, and a liquid pharmaceutical carrier therefor suitable for internal administration.

5. The product of claim 4 wherein said 2-hydroxybenzoxazole is suspended in said liquid pharmaceutical carrier.

6. A pharmaceutical composition comprising at least about 1%, by weight, of a 2-hydroxybenzoxazole compound selected from the group of 2-hydroxybenzoxazoles having the structural formula:

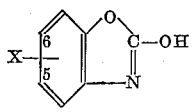

where X is selected from the group consisting of 5-chloro, 5-bromo, 6-chloro and 6-bromo, and salts thereof, and a solid pharmaceutical carrier therefor suitable for internal administration.

7. The product of claim 6 in tablet form.
8. The product of claim 7 wherein X is 5-chloro.
9. A pharmaceutical composition in dosage unit form comprising, per dosage unit, at least about 25 milligrams of a 2-hydroxybenzoxazole compound selected from the group consisting of 2-hydroxybenzoxazoles having the structural formula:

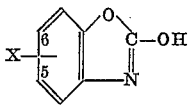

where X is selected from the group consisting of 5-chloro, 5-bromo, 6-chloro and 6-bromo, and salts thereof, and a pharmaceutical carrier therefor suitable for internal administration.

10. The product of claim 9 containing between about 100 and about 1000 milligrams of the 2-hydroxybenzoxazole compound per dosage unit.

11. The product of claim 9 wherein X is 5-chloro, and wherein the product contains between about 100 and about 1000 milligrams of 2-hydroxy-5-chlorobenzoxazole per dosage unit.

References Cited in the file of this patent

UNITED STATES PATENTS

| 2,108,712 | Herdieckerhoff et al. | Feb. 15, 1938 |
| 2,780,633 | Sam | Feb. 5, 1957 |

OTHER REFERENCES

Domino et al: J. Pharmacol. and Expt. Therapeutics, vol. 105, 1952, pp. 486–497.

Raiford et al.: J. Am. Chem. Soc., vol. 56, pp 1586–90, (1934).

Desai et al.: Chem. Abstr., vol. 32, col. 4580 (1938).

Close et al.: Chem. Abstr., vol. 43, cols. 6615–16 (1949).

Buu-Hoi et al.: Compt. rend. (Fr. Acad.), vol. 236, pp. 635–7 (1953).

Beilstein: (Handbuch, der. Org. Chem., 4th ed.), vol. 27 (1937), pp. 177, 179.

Beilstein: (Handbuch der Org. Chem., 4th ed., 2nd suppl.), vol. 27, p. 223 (1955).